United States Patent [19]

Zugcic et al.

[11] 4,062,311
[45] Dec. 13, 1977

[54] SYSTEM FOR FORMING AND TRIMMING OF TUBULAR ARTICLES

[75] Inventors: Joseph P. Zugcic, Morganville; Kevin Whiting, Bridgewater, both of N.J.

[73] Assignee: American Can Company, Greenwich, Conn.

[21] Appl. No.: 699,596

[22] Filed: June 24, 1976

[51] Int. Cl.² ............................................. B21D 51/26
[52] U.S. Cl. .................................... 113/7 R; 72/334; 83/54
[58] Field of Search ................... 113/7 R, 7 A, 120 R, 113/1 G; 72/356, 334; 82/57, 54, 58, 101; 83/54

[56] References Cited

U.S. PATENT DOCUMENTS

| 2,298,366 | 10/1942 | Gladfelter | 113/7 R |
|---|---|---|---|
| 3,130,698 | 4/1964 | Knowles | 113/7 R |
| 3,838,653 | 10/1974 | Larkin | 113/7 R |
| 3,864,995 | 2/1975 | Langewis | 82/101 |
| 3,878,743 | 4/1975 | Melind | 82/54 |
| 3,972,299 | 8/1976 | Hasselbeck | 113/7 R |

*Primary Examiner*—Leon Gilden
*Attorney, Agent, or Firm*—Robert P. Auber; Ira S. Dorman; George P. Ziehmer

[57] ABSTRACT

The instant invention relates to a system for the forming and trimming of tubular articles, such as aluminum and steel cans. The irregular edge at the open end of the can is trimmed by internally and externally positioned knives with respect to the can, with the internally positioned knife having a diameter less than 0.0015 inch shorter than the inside diameter of the can.

10 Claims, 6 Drawing Figures

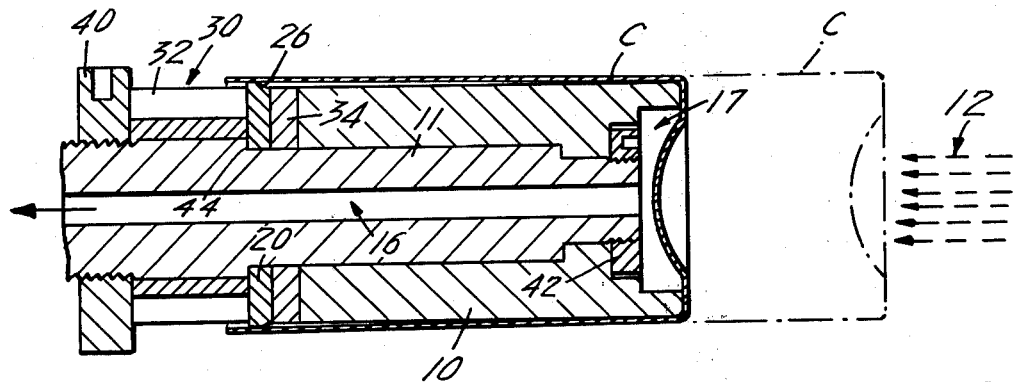
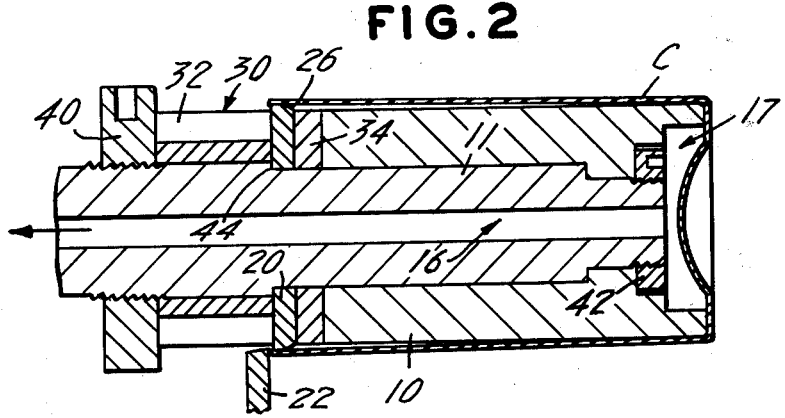
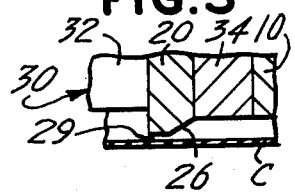
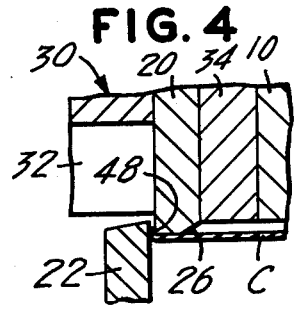
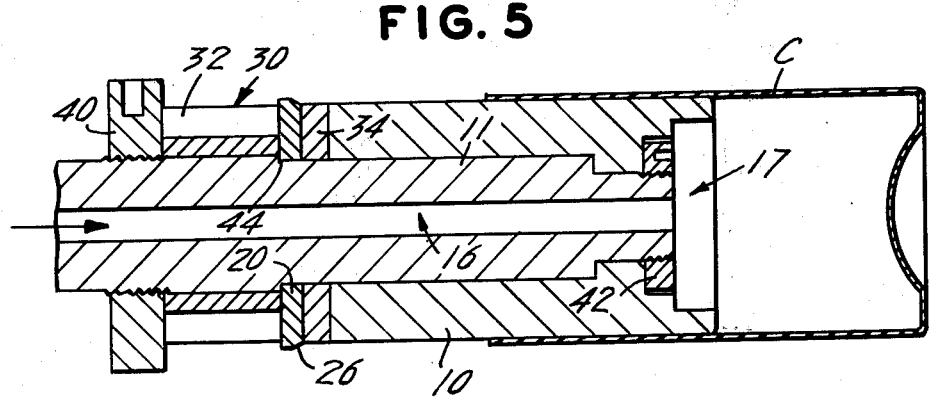

SYSTEM FOR FORMING AND TRIMMING OF TUBULAR ARTICLES

BACKGROUND OF THE INVENTION

Apparatus for trimming of the ends of cans and the like to form a smooth and uniform rim are well known in the art. These apparatus frequently employ a knife mounted about a spindle, over which the can is positioned, which cooperate with an externally positioned knife to trim the uneven metal from the rim. External holding means to the can are generally employed to hold the can in place during the trimming operation. A frequent problem often encountered, however, is the formation of slivers and steps since the can tends to move during trimming. This is unacceptable to the quality of the can and thereby causes rejects. By applicant's invention, however, this problem is eliminated, as described hereinafter.

OBJECTS OF THE INVENTION

It is therefore a principle object of the present invention to provide a system which forms tubular articles and trims uneven metal from the open end of the tubular articles without the formation of steps and slivers.

It is another object of the present invention to provide a system as aforesaid which is convenient and expeditious to use.

SUMMARY OF THE INVENTION

The system of the present invention includes a die means and punch means for urging a metal blank through said die means to form a tubular article having an open end and a bottom end. A trimming apparatus is provided which includes means for trimming the open end of the tubular article comprising first and second knife means and means for operatively supporting said article relative to said knife means. The diameter of the first knife means ranges from equal to that of the diameter of the punch means up to less than 0.0015 inch shorter than the diameter of the punch means. Transport means are included to transport the formed tubular article from the die means to the trimming means.

BRIEF DESCRIPTION OF THE DRAWING

FIG. 1 is a vertical sectional view of the instant invention showing the positioning of can thereon.

FIG. 2 is a vertical sectional view of the instant invention showing a can during a trimming operation.

FIG. 3 is an enlarged fragmentary view of the instant invention showing the positioning of the internal knife relative to the can.

FIG. 4 is an enlarged fragmentary view of the instant invention showing the knives positioned during the trimming of the end of the can.

FIG. 5 is a vertical sectional view of the instant invention showing the removal of the can following the trimming operation.

DETAILED DESCRIPTION

Figure 6:
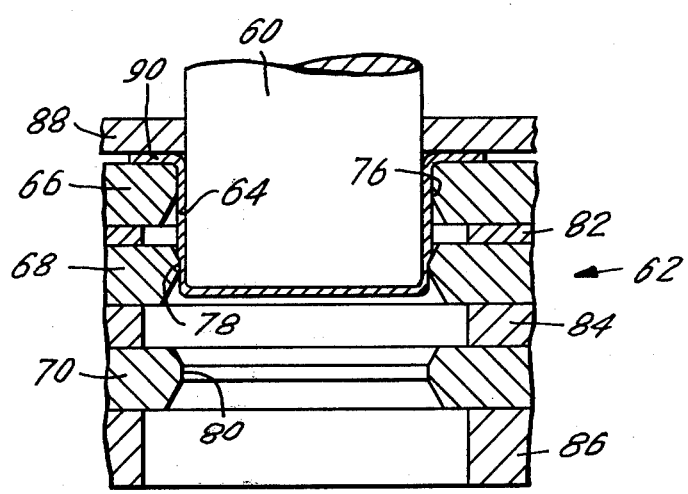
FIG. 6 is a vertical sectional view of the die mechanism and associated means for urging a metal blank through the die mechanism to form a tubular article.

Referring firstly to FIG. 1 a can C is urged by a suitable mechanism, as shown by the arrows 12, onto a mandrel 10 carried by a spindle 11 to the position shown in phantom. This mechanism can conveniently be in the form of either a plunger, or an air jet, as desired. A vacuum is then applied, denoted by the arrow 14, to the bore 16 in the spindle 11 from a source not shown, to then completely draw the can C over the mandrel 10 to its position for trimming, as illustrated in FIG. 2. During the trimming the vacuum is maintained, as denoted by the arrow 14, creating a suction or axial force in the chamber 17 against the bottom of the can C. Following trimming the can C is ejected from the mandrel 10 by forced air, from a source not shown, as denoted by the arrow 18 in FIG. 5.

Referring now to FIG. 2, a knife 20 is shown secured about the spindle 11 and perpendicular to its longitudinal axis. The spindle 11 is rotated by a power source, not shown, to which it is suitably connected. An external rotatable knife 22 is positioned to cooperate with the interior knife 20 as the knife 20 is rotated by the spindle 11 and the can is positioned. As is seen in exaggerated form, the outside diameter of the knife 20 has a taper portion 26 which, as will be understood, facilitates securedly sliding on of the can C to the trimming position. It is to be noted that the full diameter of the knife 20 ranges from equal to that of the inside diameter of the can C to less than 0.0015 inch shorter than the inside diameter of the can C, as depicted by the gap 29 in FIG. 3. In this fashion the formation of slivers and steps is avoided. It has been found that at 0.0015 inch tolerance, or gap, that the trimmed can is unacceptable while at from 0.0005 to 0.0008 inch a quality trim is obtained at line running speeds of about 140 cans per minute. A quality trim is also obtained at less than 0.0005 inch but at slower running speeds such as up to about 50 cans per minute. Thus, the more preferred range is not more than 0.0008 inch and most preferred from 0.0005 to 0.0008 inch.

Adjacent the knife 20 is a knurling gear 30, having teeth 32, likewise fixedly positioned about the spindle so that as the spindle 11 is rotated during trimming of the can C, the trimmed metal is carried away from the edge of the can, in a manner later discussed. Positioned between the knife 20 and the mandrel 10 is a spacing element 34, fixed about the spindle 11. Such a spacer is employed to maintain the trim height when using reconditioned blades. Retainer ring 40, adjacent knurling gear 30, threadingly engages the spindle 11 adjacent the chamber 17 formed by the configuration of the mandrel 10 and spindle 11. A second ring 42 is likewise threaded onto the spindle 11 adjacent the chamber 17 and engages the mandrel 10. In this fashion when the retainer ring 40 and the ring 42 are tightened in a conventional fashion the knurling gear 30, knife 20, spacer 34 and mandrel 10 are locked into position and secured about the spindle 11. This locking feature, which assures rotation of the assembly, occurs due to the force applied by tightening of the mandrel 10, spacer 34 and knife 20 against the step 44 of the spindle 11 and the counter-tightening of the knurling gear 30 against the knife 20, as shown.

Summarizing the operation of the just described apparatus a can C is partially inserted onto the mandrel 10 from an adjacent source, not shown. A suction is then applied through bore 16 of spindle 11 to fully draw and position the can C on the mandrel 10 for trimming. The rotation of the external knife 22 which cooperates with the rotating knife 20 is shown in, for example, U.S. Ser. No. 631,513 filed, Nov. 13, 1973, and now U.S. Pat. No. 3,994,251. The knurling gear 30, in cooperation with an external knurling gear as shown in the aforementioned U.S. Ser. No., now U.S. Pat. No. 3,994,251, and rotatable with the external knife 22, carries away the trimmed metal. Any burr, as shown by numeral 48 in FIG. 4, is partially removed when the can is ejected, as shown in FIG. 5, from the mandrel following trimming by being forced over the leading edge of the knife 20, as will be readily understood.

Associated with the foregoing described assembly is apparatus for forming of the can from a blank of metal. This apparatus, such as described in U.S. Pat. No. 3,360,157, employs a punch and die assembly to cup and then elongate a metal blank into the shape of a tubular article, or can, as shown in FIG. 6. In more detail, a punch 60 is attached to a power source, not shown, for actuation of the punch. A die assembly, designated generally by the arrow 62, operatively receives the punch 60 and a metal blank to form a tubular article 64. The die assembly 62 includes an upper, or drawing die, 66 and ironing dies, 68 and 70 positioned beneath the drawing die 66 as shown, to receive the metal and form the tubular article. The drawing die 66 has a drawing face 76 and the ironing dies 68 and 70 include ironing faces 78 and 80, respectively. A spacer 82 is positioned between the dies 66 and 68, forming a predetermined distance between the drawing face 76 and the ironing face 78, and likewise a spacer 84 is positioned between dies 68 and 70 to form a pre-determined distance between ironing faces 78 and 80. The foregoing dies and spacers are carried by a die carrier 86. On top of the just described assembly is a blank holder 88 suitably mounted to receive and maintain pressure on a blank and having an inner diameter slightly greater than the punch 60.

In operation a metal blank, the residual of which is shown by numeral 90, positioned beneath the blank holder 88 is urged downwardly by the punch 60 and thereby the metal is drawn across the drawing 76 of the die 66. Sufficient gripping is maintained by the blank holder 88 to insure that the metal is plastically stretched as the metal is drawn across the drawing face 76. As the now partially formed tubular article or cup is urged further downward by the punch 60 the ironing faces 78 and 80 of the ironing dies 68 and 70 elongate the article and reduce its sidewall thickness. Further continuing downward movement ejects the now formed tubular article, or can, which is then stripped from the punch 60 in any conventional manner. Suitable means are provided to transport the cans to the previously described trimming mechanism.

In accordance with the previously described tolerances the diameter of the knife 20 ranges from equal to that of the diameter of the punch 60 to less than 0.0015 inch shorter than the diameter of the punch 60, preferably not more than 0.0008 inch shorter, and most preferably from 0.0005 to 0.0008 inch shorter.

While a preferred embodiment of the instant invention has been described, it is understood that various modifications may be made without departing from the spirit and scope of the invention.

What is claimed is:

1. A system for the forming and trimming of a metal tubular article having an open end and a bottom end comprising, means for forming a tubular article comprising die means, punch means having a diameter operatively associated with said die means for urging metal through said die means to form said tubular article, means for operatively supporting said tubular article, means associated with said supporting means for holding said tubular article on said supporting means, means connected to said supporting means for rotating said supporting means and thereby said tubular article, first knife means having a diameter and operatively connected with said supporting means for trimming said open end of said tubular article when said tubular article is operatively supported by said supporting means, second knife means associated with said first knife means and positioned to cooperate with said first knife means for said trimming, said diameter of said first knife means ranging from equal to that of the diameter of said punch means to less than 0.0015 inch shorter than said diameter of said punch means, and including means for transporting said tubular article from said die means to said supporting means.

2. A system in accordance with claim 1 wherein said diameter of said first knife means is not more than 0.0008 inch shorter than said diameter of said punch means.

3. A system in accordance with claim 1 wherein said diameter of said first knife means is from 0.0005 inch to 0.0008 inch shorter than the diameter of said punch means.

4. A system in accordance with claim 1 wherein said supporting means having said first knife means includes a spindle having first and second portions and having a longitudinal axis, with said first knife means being connected to said first portion of said spindle perpendicular to said longitudinal axis, and a mandrel fixed about said second portion of said spindle.

5. A system in accordance with claim 4 wherein said means for holding said tubular article on said supporting means includes vacuum means operable to hold said tubular article.

6. A system in accordance with claim 5 wherein said spindle includes a bore operatively connected with said vacuum means for applying said vaccuum through said bore.

7. A system in accordance with claim 6 wherein said spindle and said mandrel are configured to provide a chamber adjacent the bottom end of said can and communicating with said bore.

8. A system in accordance with claim 7 including external means to assist in positioning said tubular article about said mandrel.

9. A system in accordance with claim 8 including air jet means to assist in positioning said tubular article about said mandrel.

10. A system according to claim 9 including spacing means to maintain the trimming position when using reconditioned first knife means.

* * * * *